INVENTORS:
SIEGFRIED VOLLPRECHT
JOSEF SCHMID by

Michael J. Striker
their ATTORNEY

April 12, 1966  S. VOLLPRECHT ETAL  3,245,618
VALVE ASSEMBLY FOR GAS BURNERS
Filed Oct. 11, 1963  3 Sheets-Sheet 3

INVENTORS:
SIEGFRIED VOLLPRECHT
JOSEF SCHMID by

Michael J. Striker
their ATTORNEY

United States Patent Office 3,245,618
Patented Apr. 12, 1966

3,245,618
VALVE ASSEMBLY FOR GAS BURNERS
Siegfried Vollprecht and Josef Schmid, Wernau (Neckar), Germany, assignors to Junkers and Co. G.m.b.H., Wernau (Neckar), Germany
Filed Oct. 11, 1963, Ser. No. 315,487
Claims priority, application Germany, Oct. 13, 1962, J 22,496
6 Claims. (Cl. 236—1)

The present invention relates to gas burning apparatus in general, and more particularly to an improved valve assembly which serves to control the flow of a gaseous fuel to the pilot burners and/or main burners of such apparatus. Still more particularly, the invention relates to an improved valve assembly which enables an operator to cut off, to permit and to regulate the rate of flow of gaseous fuel to one or more main burners and preferably to one or more pilot burners, and wherein the main regulating valve is controlled by a thermostat of any known design.

It is an important object of the invention to provide a very compact valve assembly which may be manipulated by unskilled persons, which may be readily combined with and accommodated in or on many types of conventional gas burning apparatus, which insures practically noiseless operation of gas-heated water heaters, gas-burning ranges and similar gas burning apparatus, and which prevents excessive cooling of chimneys such as could result in deposition of moisture and accumulation of excessive soot.

Another object of the invention is to provide a valve assembly wherein a series of valves, a thermostat, an electromagnet, and an interrupter device may be accommodated in a very small casing such as will occupy little space in or on a gas burning apparatus.

A further object of the invention is to provide a valve assembly of the above outlined characteristics which is capable of automatically adjusting the flow of gaseous fuel to one or more burners so that the apparatus embodying the valve assembly will be heated to requisite temperature in a fully automatic way.

An additional object of the invention is to provide a valve assembly which comprises two make-and-break valves each of which is movable into fully open or fully closed position and which may be opened and/or closed, either simultaneously or sequentially, at the will of the operator so that the operator may determine the rate at which the gas flows to one or more burners by selecting a comparatively small stream, a larger stream or a largest stream, depending on the fuel requirements at a given time of the day, at a given time of the year, or depending on other considerations.

Still another object of the invention is to provide a valve assembly wherein a single manipulation suffices to shut off the flow of gaseous fuel to one of more main burners and to one or more pilot burners to make sure that there is absolutely no escape of gaseous fuel at any point of the apparatus in which the valve assembly is put to use.

With the above objects in view, one feature of our invention resides in the provision of a valve assembly which comprises a single casing having a gas-admitting inlet, an outlet, and internal partition means defining a comparatively large main passage and a comparatively small bypass passage each providing a separate path through which a gaseous fuel may flow from the inlet to the outlet, a regulating valve including a valve member movable between two end positions to respectively seal and expose the main passage, means for normally biasing the valve member to one of its end positions, thermostat means arranged to move the valve member to the other end position in response to a predetermined temperature, a bypass valve including a second valve member movable between two end positions to respectively seal and expose the bypass passage, means for normally biasing the second valve member to one of its end positions, and manually operated actuating means arranged to move the second valve member to the other end position at the will of the operator so that each valve member always assumes one of its end positions.

The novel features which are considered as characteristic of the invention are set forth in particular in the appended claims. The improved valve assembly itself, however, both as to its construction and the mode of assembling and operating the same, together with additional features and advantages thereof, will be best understood upon perusal of the following detailed description of certain specific embodiments with reference to the accompanying drawings, in which:

Figure 1:
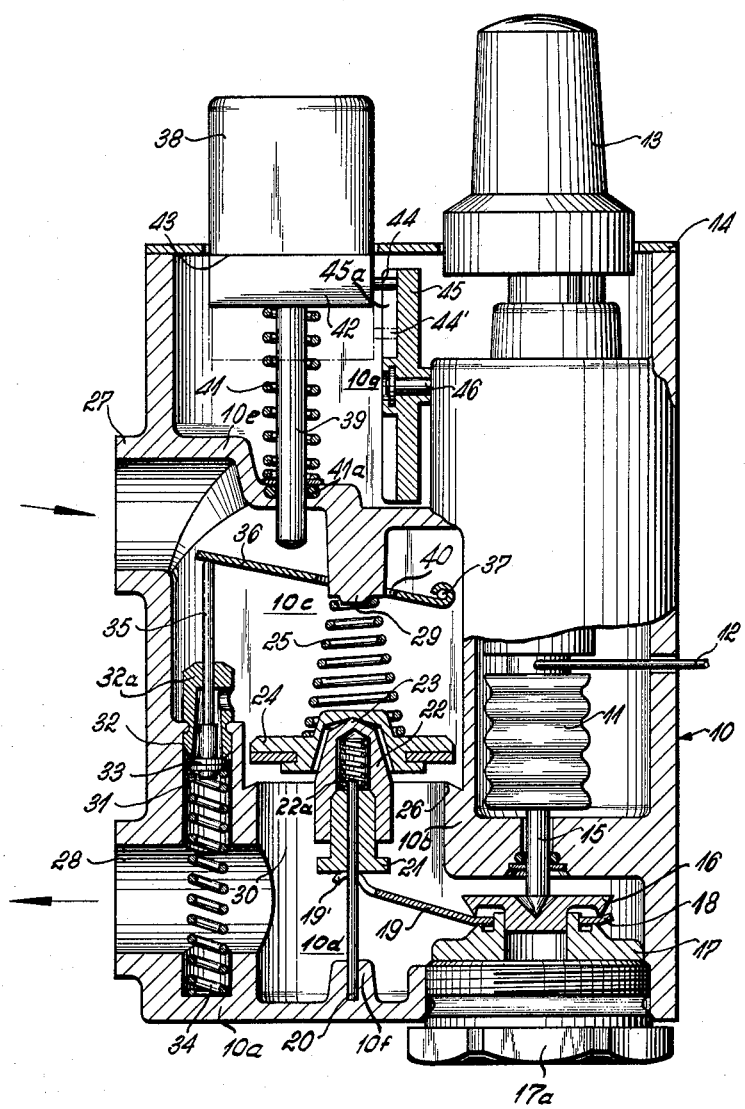
FIG. 1 is a central vertical section through a valve assembly which embodies one form of our invention.

Referring to the drawings, and first to FIG. 1, there is shown a valve assembly which includes a casing 10 arranged to accommodate a reciprocable valve member 24 forming part of a thermostatically operated regulating valve, a reciprocable valve member 33 forming part of a bypass valve, and the expansive element 11 of a conventional expanding thermostat. The element 11 is connected with a conduit 12 leading to a non-illustrated temperature measuring or sensing device of any known design. The top wall 14 of the casing 10 is formed with an aperture for a manually operable temperature selecting knob 13 which serves to adjust the thermostat so that the thermostat adjusts the regulating valve in response to a predetermined temperature. Thus, depending on the setting of the knob 13 which is rotatable about a fixed axis, the thermostat will respond to a certain temperature measured by the sensing device which is connected to the conduit 12, and the expansive element 11 will then shift a reciprocable stud 15 whose tip extends into a central conical recess provided in the upper side of a deforming disk 16 having at its underside an annular ridge which bears against a deformable annular washer 18. This washer 18 consists of elastic material and rests on a supporting block 17 connected to a nipple 17a which is screwed into the bottom wall 10a of the casing 10. The marginal portion of the washer 18 may snap from the one to the other side of the general plane of this washer to thereby pivot an elongated stop here shown as an arm 19 whose hook-shaped end portion 19' surrounds a portion of a guide pin 20 which is parallel with the stud 15. The end portion 19' abuts against the underside of a guide sleeve 21 which is slidable along the pin 20 and which carries a tubular support 22 for the valve member 24. The upper end portion 23 of the support 22 is of conical shape to form a fulcrum for the valve member 24 so that the latter may be tilted in all directions but remains concentric with the support 22 because it is biased against this support by a resilient element here shown as a helical spring 25. The lower end of the pin 20 is anchored in the bottom wall 10a of the casing 10, and this casing comprises an internal portion in the form of a partition 10b which defines a comparatively large passage 30 and a seat 26 located at the upper end of the passage 30, i.e., at the upper side of the partition 10b. A weak helical expansion spring 22a which is provided in the interior of the tubular support 22 bears against the upper end face of the sleeve 21 and tends to move the latter away from the conical end portion 23. An internal annular shoulder in the support 22 determines the minimum distance between the upper end of the sleeve 21 and the valve member 24. If desired, the axial position of the pin 20 with respect to the bottom wall 10a may be adjusted, and it is equally possible to provide for an adjustable connection between the sleeve 21 and support 22 so that the combined length of these parts may be varied in order to maintain the valve member 24 at a selected distance from the seat 26 when the arm 19 of the washer 18 assumes the position of FIG. 1.

When the arm 19 is in the position of FIG. 1, it must withstand the bias of the spring 25 in order to maintain the valve member 24 of the regulating valve in open position in which this valve member permits flow of a gaseous fuel from a gas-admitting inlet 27 through a chamber 10c at the upper side of the partition 10b, through the passage 30, through a second chamber 10d at the underside of the partition 10b, and through an outlet 28 whence the fuel flows to one or more main valves, not shown. A downwardly extending projection 29 provided at the underside of a second partition 10e which is located above the chamber 10c serves as an abutment for the uppermost convolution of the spring 25.

It will be noted that the regulating valve which includes the valve member 24, the seat 26 and the spring 25 is of the make-and-break type in that it either permits or terminates the flow of gaseous fuel through the passage 30. This is due to the fact that the arm 19 either snaps to the position of FIG. 1 or to a second position in which it may abut against a boss 10f on the bottom wall 10a and in which it permits the spring 25 to move the valve member 24 into sealing abutment with the seat 26. The axis of the thermostat including the expansive element 11 is parallel with the axis of the regulating valve.

The passage 30 is the main passage of the valve assembly which latter further includes a comparatively small auxiliary passage or bypass passage 31 also defined by the partition 10b and serving to permit flow of gaseous fuel from the inlet 27 to the outlet 28 irrespective of whether the valve member 24 assumes its sealing or open position. The upper end of this passage 31 receives a bearing sleeve 32a which forms at its lower end an annular seat 32 for the valve member 33 whose stem 35 extends upwardly and is slidably guided by the bearing sleeve 32a. This sleeve has a lateral intake port which is in permanent communication with the chamber 10c. The valve member 33 is normally biased against its seat 32 by a resilient element here shown as a helical expansion spring 34 which is accommodated in the chamber 10d and whose lowermost convolution bears against the bottom wall 10a. The stem 35 is parallel with the guide pin 20, and its upper end portion abuts against a motion transmitting lever 36 which is rockable about a horizontal pivot pin 37 secured to the casing 10. The lever 36 is of considerable width and is formed with an opening 40 which receives the lower portion of the projection 29 and whose diameter is selected in such a way that the lever 36 is free to pivot in a counterclockwise direction, as viewed in FIG. 1.

The actuating means for moving the valve member 33 to its open position (i.e., downwardly and away from the seat 32) comprises an elongated motion transmitting rod 39 which is parallel with the stem 35 and which is slidable in the upper partition 10e. The upper end of this rod 39 is connected with a manually operable pushbutton 38 which extends above the upper side of the top wall 14 and which may be depressed by the finger of an operator in order to pivot the lever 36 about the pin 37 and to thereby move the stem 35 downwardly against the bias of the spring 34 whereby the valve member 33 moves away from its seat 32 and exposes the bypass passage 31 so that a comparatively small stream of gaseous fuel may flow to the outlet 28 even if the regulating valve including the valve member 24 is closed. The pushbutton 38 is provided with a laterally extending flange 42 defining a shoulder 43 which abuts against the underside of the top wall 14 when the pushbutton is released by the finger of an operator. A resilient element in the form of a helical spring 41 is provided in a compartment 10g between the partition 10e and the top wall 14 to serve as a means for normally maintaining the pushbutton 38 in the idle position of FIG. 1 in which the flange 43 abuts against the inner side of the top wall 14. The partition 10e accommodates an annular sealing ring 41a which prevents leakage of gaseous fuel to the compartment 10g.

It will be noted that the bypass valve which includes the valve member 33, the seat 32 and the spring 34 is also a so-called make-and-break valve because the valve member 33 is either moved to its fully open or closed position but does not assume any intermediate positions. Thus, when the pushbutton 38 is not depressed, the spring 34 maintains the valve member 33 in sealing position. On the other hand, when the pushbutton 38 is depressed, the valve member 33 immediately moves to its open position.

The valve assembly of FIG. 1 further comprises suitable locking or arresting means which serves to retain the valve member 33 of the bypass valve in open position for any desired periods of time which are selected at the will of the operator. The locking means comprises a rotary disk 45 of suitable synthetic plastic material which is rotatable about the axis of a short shaft 46 provided in the compartment 10g and extending at right angles to the axis of the rod 39. The left-hand side of the disk 45 is formed with one or more substantially J-shaped cam grooves 45a one of which receives a follower pin 44. This pin is rigid with the flange 42 and is received in the longer leg of the selected cam groove 45a. When the operator depresses the pushbutton 38, the pin 44 travels radially inwardly toward the axis of the disk 45 which begins to rotate when the pin reaches the arcuate bottom zone of its groove 45a so that the pin is automatically caused to enter the shorter leg of the groove and permits the pushbutton 38 to move slightly outwardly when the operator removes his finger therefrom. The rod 39 then continues to maintain the valve member 33 in open position while the pin 44 assumes the broken-line position 44'. When the operator thereupon desires to seal the bypass passage 31, he merely depresses the pushbutton 38 all the way down whereby the pin 44 travels in the shorter leg of the respective cam groove 45a and causes the disk 45 to rotate in the opposite direction until the pin enters the longer leg of its groove and permits the pushbutton 38 to return to the position of FIG. 1 in which the rod 39 allows the valve member 33 to move into sealing engagement with the seat 32 under the bias of the spring 34.

The valve assembly of FIG. 1 is operated as follows:

The inlet 27 is connected with a source of gaseous fuel, preferably through the intermediary of a safety valve one embodiment of which will be described in connection with FIGS. 2 and 3. When the safety valve is open, fuel is free to flow into the chamber 10c and through the main passage 30 to enter the chamber 10d and to continue through the outlet 28 into one or more main burners, not shown. Such operation takes place when the expansive element 11 contracts and allows the arm 19 to assume the unstressed position of FIG. 1 so as to maintain the valve member 24 of the regulating valve in open position. When the temperature prevailing in the space which is heated by the main burner or burners rises to a predetermined value, the element 11 expands in a fully automatic way and causes the disk 16 to deform the washer 18 whereby the arm 19 moves toward the boss 10f and enables the spring 25 to move the valve member 24 into sealing engagement with the seat 26.

If the operator desires to keep the flame of the main burner or burners alive without interruptions but nevertheless to control the heating action of the burners, he depresses and thereupon releases the pushbutton 38 so that the follower pin 44 assumes the position 44' and cooperates with the disk 45 to lock the pushbutton 38 in depressed position in which the rod 39 keeps the valve member 33 away from the seat 32 and allows a smaller stream of gaseous fuel to flow through the outlet 28 and to the main burner or burners. This means that a small flame will burn as long as the pushbutton 38 remains locked by the parts 44, 45 and, whenever necessary, the thermostat will cause the valve member 24 to open the main passage 30 and to permit a large stream of gaseous fuel to flow into one or more main burners. In this manner, the operator avoids undesirable noises which arise when cold pipes or similar parts are subjected to rapid heating action without any transition between the full heating action and no heat at all. For example, and when the main burners serve to heat a boiler which furnishes hot water to a central heating system, the small flame or flames developing on burning of fuel which flows through the bypass passage 31 will heat the water to a given temperature but, should the temperature in the rooms drop, the thermostat will open the regulating valve and will cause the main burners to heat the water to a higher temperature. In such manner, the temperature in the rooms which are heated by the boiler will remain within a desired range which is selected by the knob 13.

Figure 2:
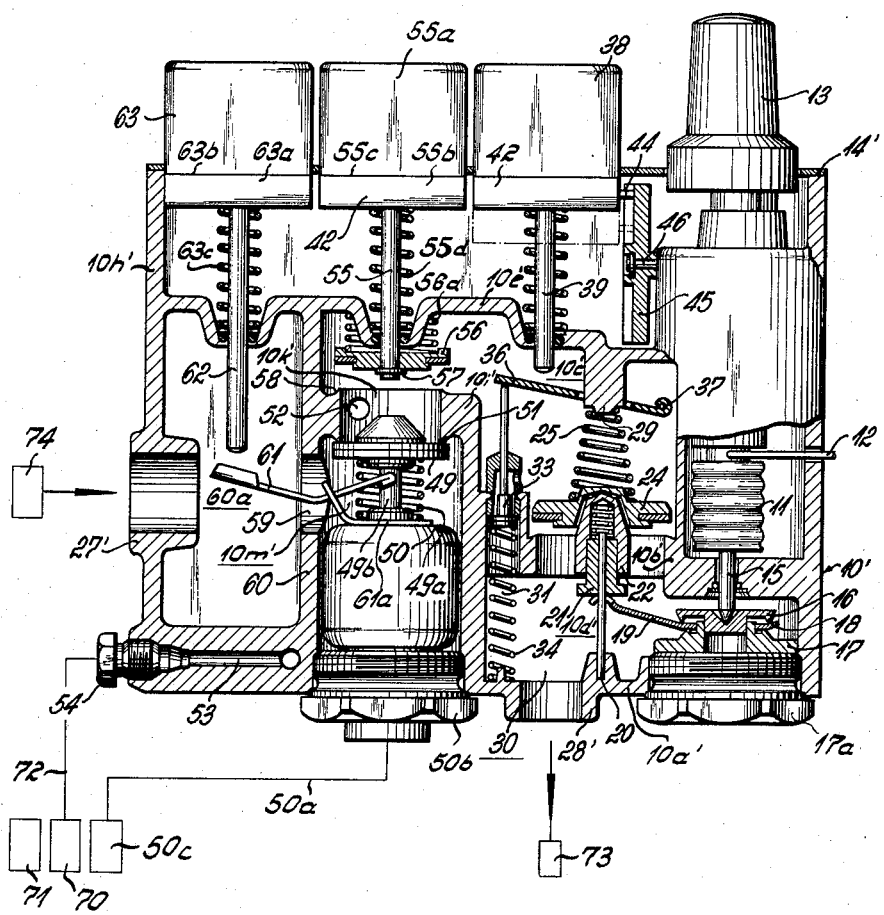
FIG. 2 is a similar section through a modified valve assembly which, in addition to the parts shown in FIG. 1, comprises a thermoelectrically controlled safety valve.

FIG. 2 illustrates a modified valve assembly which embodies all component parts of the valve assembly shown in FIG. 1 and a special safety valve having an electromagnetically controlled valve member 49. The modified valve assembly comprises a somewhat larger casing 10' having a bottom wall 10a', a top wall 14', a lower internal portion or partition 10b', an upper partition 10e', an outlet 28' which is provided in the bottom wall 10a', and a gas-admitting inlet 27' which is provided in the left-hand side wall 10h' of the casing 10'. All parts of the thermostat, of the regulating valve, and of the bypass valve are identified by numerals used in connection with FIG. 1 and need not be described again.

The exact construction of the safety valve forms no part of this invention and will be described solely to the extent necessary for full understanding of the advantages of the valve assembly. A safety valve of this general type is disclosed and claimed in a copending application Serial No. 315,799, entitled, "Safety Valve for Gas Burners," which was filed by Siegfried Vollprecht and which is assigned to the same assignee.

The valve member 49 of the safety valve is reciprocable toward and away from an annular seat 51 which is provided at the underside of a horizontal portion or partition 10i' in the interior of the casing 10'. This valve member 49 is biased by a resilient element here shown as a helical spring 49a which tends to move it to closing or sealing position and which operates between the underside of the valve member 49 and the upper end wall of an electromagnet 50 of the type disclosed in a copending application Serial No. 311,062, entitled, "Electromagnet for Safety Valves and the Like," which was filed by Josef Schmid and Andreas Pritzkow and which is assigned to the same assignee. It suffices to say that the housing of the electromagnet 50 accommodates a core, a winding, a reciprocable armature which is connected with the valve member 49 by a rod 49b, and a conductor 50a secured to a threaded plug 50b which is screwed into the bottom wall 10a' and which carries the electromagnet 50. The conductor 50a is connected with a thermoelectric current generator 50c which is adjacent to the flame of a pilot burner 70. This pilot burner cooperates with an igniter 71 and, when it receives a stream of gaseous fuel, it heats the generator 50c which sends a weak current to the winding of the electromagnet 50 whereby the latter is energized and its core attracts the armature which in turn causes the rod 49b to move downwardly, as viewed in FIG. 2, and to shift the valve member 49 against the bias of the spring 49a so that the valve member 49 remains in open position as long as the flame of the pilot burner 70 is alive. The partition 10i' defines a passage 10k whose lower end is surrounded by the seat 51 and whose upper end communicates with the chamber 10c'. The partition 10i' has a vertical extension which terminates at the bottom wall 10a' and which separates the chambers 10c', 10d' from a further chamber 10m' provided between the partition 10i' and a vertical partition 60 extending between the bottom wall 10a' and the partition 10e'. The side wall 10h', the bottom wall 10a', the partition 60 and the partition 10e' define between themselves a further chamber 60a which communicates with the inlet 27' and with an opening 59 provided in the partition 60 and leading to the chamber 10m'. Thus, when the valve member 49 is in the sealing position of FIG. 2, it prevents flow of gaseous fuel from the inlet 27' to the passages 30, 31 so that the chamber 10c' may receive fuel only when the flame of the pilot burner 70 is alive and causes the generator 50c to energize the electromagnet 50.

The passage 10k' communicates with a bore 52 provided in the partition 10i' and leading to a second outlet or port 53 provided in the bottom wall 10a' and receiving a nipple 54 which is connected with the pilot burner 70 by a conduit 72. Thus, when the electromagnet 50 is deenergized, the valve member 49 automatically prevents flow of any fuel not only to a main burner 73 which is connected with the outlet 28' but also to the pilot burner 70 to avoid any likelihood of uncontrolled escape of non-ignited fuel. The inlet 27' receives fuel from a source 74. The manner in which the pilot burner 70, the thermoelectric current generator 50c, and the igniter 71 may be mounted on a common support is disclosed in Patent No. 3,200,875. It is obvious that the igniter 71 may be omitted and that fuel escaping from the orifices of the pilot burner 70 may be ignited by a match or the like.

The valve assembly of FIG. 2 further comprises a second actuating device which serves to open the safety valve when the electromagnet 50 is deenergized and which comprises an elongated rod 55 extending through the partition 10e' and secured at its upper end to a pushbutton 55a. The pushbutton has a flange 55b defining a shoulder 55c which abuts against the underside of the top wall 14' under the bias of a spring 55d. The lower end portion of the rod 55 carries a stop 57 for a valve member 56 which is axially movable along the rod and which is biased by a spring 56a.

When the operator depresses the pushbutton 55a, the lower end face of the rod 55 engages the valve member 49 of the safety valve and moves this valve member away from the seat 51 to expose the passage 10k'. At the same time, the spring 56a is free to expand and moves the valve member 56 into sealing engagement with an annular seat 58 at the upper side of the partition 10i' to seal the passage 10k' from the chamber 10c'. The bore 52 then communicates with the inlet 27' (because the valve member 49 is moved away from its seat 51) whereby the pilot burner 70 receives a stream of gaseous fuel which is ignited by the igniter 71 or by a match to produce a flame. The flame heats the generator 50c which sends a weak current to the winding of the electromagnet 50 and the electromagnet is energized to maintain the valve member 49 in open position as long as the flame of the pilot burner 70 is alive even if the operator releases the pushbutton 55a. Thus, the pushbutton 55a is depressed when the operator desires to energize the electromagnet 50 and to maintain the safety valve in open position so that the chamber 10c' may be filled with gaseous fuel. However, the electromagnet 50 is deenergized as soon as the flame of the pilot burner 70 is extinguished and the valve member 49 immediately returns to sealing position.

The safety valve is combined with an interrupter device which includes a two-armed interrupter lever 61 pivotably mounted on a bearing bracket 61a which is rotatably mounted on the housing of the electromagnet 50. The right-hand arm of the lever 61 extends into the space between the electromagnet 50 and valve member 49, and the left-hand arm of the lever 61 extends into the path of a reciprocable motion transmitting rod 62 which is slidable in the partition 10e' and which is connected with a pushbutton 63 having a flange 63a defining a shoulder 63b which normally abuts against the underside of the top wall 14' under the bias of a helical spring 63c. When the operator decides to depress the pushbutton 63, the rod 62 pivots the lever 61 in a counter-clockwise direction, as viewed in FIG. 2, to move the valve member 49 against the seat 51 even if the electromagnet is energized. The valve member 49 then seals the bore 52 from the pilot burner 70 to extinguish the pilot flame whereby the electromagnet 50c is deenergized and the valve member 49 remains in sealing position even if the pushbutton 63 is released. Thus, the interrupter device including the lever 61, the rod 62 and the pushbutton 63 serves to positively prevent any flow of gaseous fuel beyond the seat 51 to prevent uncontrolled escape of fuel through the outlet 28' and/or 53. This may become necessary when the family leaves the home and desires to shut off not only the main burner or burners but also the pilot burner of a gas heater.

The interrupter device 61–63 constitutes an optional feature of the valve assembly and may be dispensed with, especially if the pilot burner 70 is readily accessible so that the user may close the safety valve by blowing out the pilot flame. In such valve assemblies, the opening 59 constitutes the inlet of the casing.

The axes of the rods 39, 55, 62 are parallel to each other and are preferably disposed in a common plane passing through the fixed axis of the temperature selecting knob 13. The pushbuttons 38, 55a, 63 are preferably closely adjacent to each other, see also FIG. 3. The axis of rotation of the knob 13 is parallel with the axes of the rods 39, 55 and 62. The top wall 14' is detachably secured to the main body portion of the casing 10' by screws 14a' which are shown in FIG. 3.

Figure 3:
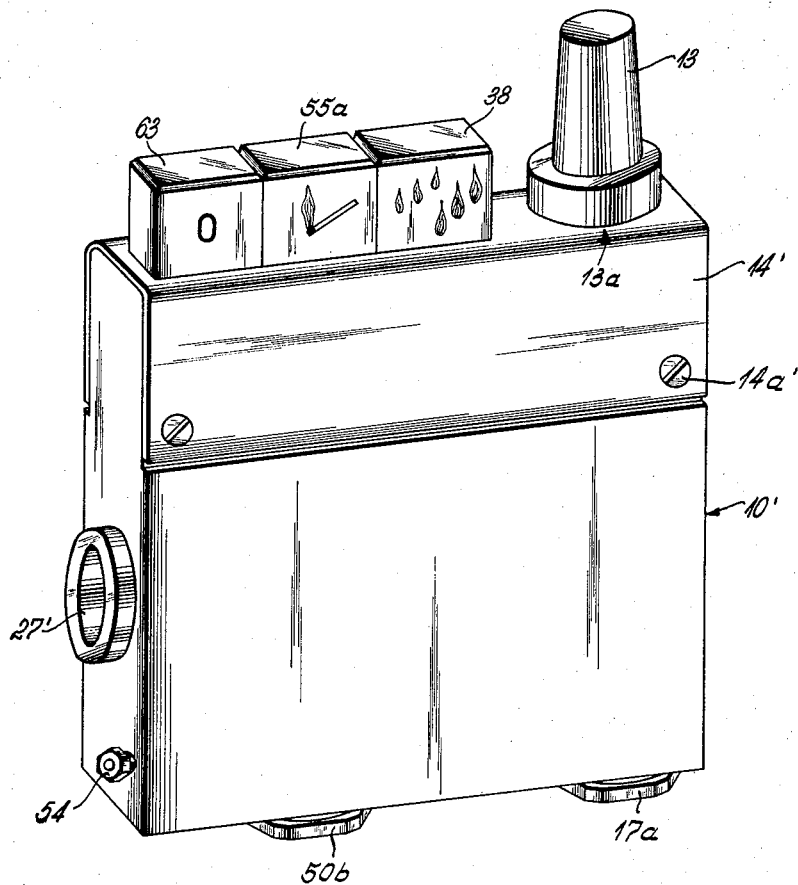
FIG. 3 is a perspective view of the valve assembly which is shown in FIG. 2.
Figure 4:
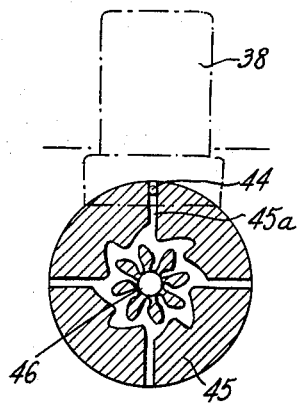

When the valve assembly of FIGS. 2 and 3 is built into a heating system, the knob 13 is adjusted in a first step with reference to a stationary marker 13a on the top wall 14a' whereby the user selects the exact temperature at which the regulating valve should open. In the next step, the operator depresses the pushbutton 55a to open the safety valve and to admit a stream of fuel to the pilot burner 70. This stream is ignited by the igniter 71 or by a match whereby the resulting flame heats the generator 50c which energizes the electromagnet 50 and the latter thereupon maintains the valve member 49 of the safety valve in open position even if the pushbutton 55a is released. The valve assembly is now ready to be operated by the thermostat which will open the regulating valve by moving the valve member 24 away from the seat 26 whenever the temperature in the rooms to be heated drops below a temperature which is selected by the knob 13. If the operator desires to permit a constant flow of gaseous fuel to the main burner 73, he depresses the pushbutton 38 so that the locking device 42, 45 retains the rod 39 in depressed position to open the bypass valve whose valve member 33 permits a small stream of gaseous fuel to flow through the passage 31 and into the outlet 28'. This means that the flame of the main burner 73 remains ignited until the operator decides to again depress the pushbutton 38 in order to release the pin 42 and to return the valve member 33 to its sealing position. Of course, the main burner 73 receives more fuel whenever the element 11 expands sufficiently to expose the passage 30 and to enable a large stream of fuel to flow into the main burner.

If the operator thereupon decides to shut off the heater, it suffices to depress the pushbutton 63 which causes the lever 61 to return the valve member 49 of the safety valve to its sealing position to prevent flow of any fuel to the outlets 28', 53 and to extinguish the pilot flame and the main flame in a simultaneous step. The electromagnet 50 is deenergized and allows the spring 49a to maintain the valve member 49 in sealing position even if the pushbutton 63 is released.

An important advantage of our improved valve assembly is that it occupies very little space, that all of its components are assembled in a common casing 10 or 10', and that this casing may be readily installed in many conventional gas burning apparatus. As shown in FIG. 3, the casing 10' assumes the form of a flat block of rectangular outline one end face of which must remain exposed to afford access to the knob 13 and pushbuttons 38, 55a, 63. Thus, all controls may be manipulated at one side of the casing 10' and, as shown in FIG. 3, each of the pushbuttons 38, 55a, 63 may be provided with suitable inscriptions, pictures or other indicia to facilitate rapid identification and to reduce the likelihood of improper manipulation by housewives, teenagers and other persons having little technical skill.

For example, and if the valve assembly is used in a water heater which delivers hot water to radiators, the bypass valve remains closed in late fall or in early spring so that the rooms will be heated only in response to opening of the thermostatically controlled regulating valve. In winter, the bypass valve is kept open to insure that the boiler remains in continuous operation and that the piping cannot become entirely cool. Thus, one avoids undesirable noises which develop when hot water is admitted into cold pipes and, furthermore, the chimney remains heated at all times to prevent deposition of moisture and excessive accumulation of soot such as would take place if a chimney is rapidly heated in cold weather.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A valve assembly for gas burning apparatus, comprising a casing having gas-admitting inlet means, outlet means, and a first portion defining a main passage and a bypass passage each providing a separate path in which a gaseous fuel may flow to said outlet means, said casing further comprising a second portion defining a third passage providing a path in which a gaseous fuel may flow from said inlet means to said main passage and said bypass passage; a regulating valve including a valve member movable between two end positions to respectively seal and expose said main passage, said valve member being arranged to normally assume one of said end positions; thermostat means arranged to move said valve member to the other end position in response to a predetermined temperature, said thermostat means comprising a temperature selecting knob extending from said casing and arranged to rotate about a fixed axis; a bypass valve including a second valve member movable between two end positions to respectively seal and expose said bypass passage, said second valve member being arranged to normally assume one of its end positions; manually operated actuating means arranged to move said second valve member to the other end position thereof at the will of the operator and independently of the operation of said thermostat means so that each of said valve members always assumes one of its end positions, said manually operated actuating means comprising a first rod reciprocably mounted in said casing and a first pushbutton secured to said first rod and extending from said casing in close proximity of said knob; and a thermoelectrically operated safety valve provided in said casing and arranged to control the flow of fuel from said inlet means to said passages, said safety valve comprising a third valve member movable into and out of sealing engagement with said second portion to respectively seal and expose said third passage, an electromagnet having a movable armature connected with and arranged to move said third valve member away from said third passage when said electromagnet is energized, and second actuating means comprising a second rod reciprocably mounted in said casing and arranged to move said third valve member away from said third passage at the will of the operator, said second actuating means including a second pushbutton connected with said second rod and extending from said casing in proximity of said first pushbutton, the fixed axis of said knob being parallel to and coplanar with the axes of said rods.

2. A valve assembly as set forth in claim 1, further comprising interrupter means arranged to move said third valve member into sealing engagement with said second portion of said casing at the will of the operator so that said safety valve is closed, said interruper means comprising a third rod reciprocably received in said casing and a third pushbutton connected with said third rod and extending from said casing in close proximity of said second pushbutton, the axis of said third rod being parallel to and coplanar with the axes of said first mentioned rods.

3. A valve assembly as set forth in claim 2, wherein said casing is a flat block of substantially rectangular outline comprising a narrow top wall and wherein said knob and said pushbuttons extend beyond said top wall.

4. In a gas burning apparatus, in combination, a source of gaseous fuel; a pilot burner; a thermoelectric current generator adjacent to and arranged to produce a current in response to heating by said pilot burner; a main burner; and a valve assembly including a casing having an inlet connected with said source, a first outlet connected with said pilot burner, a second outlet connected with said main burner, a first internal partition defining a main passage and a bypass passage each providing a separate path for flow of fuel from said inlet to said second outlet, and a second internal partition defining a third passage through which a stream of fuel may flow from said inlet to said first mentioned passages, said third passage further communicating with a bore provided in said casing and leading to said first outlet so that, when said third passage is open to said inlet, fuel may flow to said pilot burner whereby the pilot burner heats said generator, a regulating valve comprising a first valve member movable into and out of sealing engagement with said first partition and normally sealing said main passage, manually operated thermostat means arranged to move said valve member away from said main passage in response to a predetermined temperature, a bypass valve comprising a second valve member movable into and out of sealing engagement with said first partition and normally sealing said bypass passage, manually operated first actuating means arranged to move said second valve member away from said bypass passage at the will of the operator, locking means arranged to maintain said second valve member in open position for periods of time determined by the operator, a safety valve comprising a third valve member movable into and out of sealing engagement with said second partition and normally sealing said third passage from said inlet, an electromagnet connected with and energizable by said generator and arranged to maintain said third valve member in open position in response to heating of said generator, manually operated second actuating means arranged to move said third valve member away from said third passage when said electromagnet is deenergized so that said bore communicates with said inlet via said third passage, and a fourth valve member arranged to seal said third passage from said main passage and said bypass passage when said second actuating means moves said third valve member away from said third passage.

5. A combination as set forth in claim 4, further comprising manually operated interrupter means arranged to move said third valve member into sealing engagement with said second partition against the action of said electromagnet.

6. A combination as set forth in claim 5, wherein said casing comprises a top wall and wherein each of said manually operated means comprises a portion extending beyond said top wall so that each thereof may be manipulated from the same side of said casing.

References Cited by the Examiner

UNITED STATES PATENTS

| 2,087,443 | 7/1937 | Newell _____ 236—15 |
| 2,945,502 | 7/1960 | Mathews _____ 158—131 X |
| 2,977,967 | 4/1961 | Weber et al. |

FREDERICK L. MATTESON, Jr., *Primary Examiner.*

EDWARD J. MICHAEL, *Examiner.*